US011879445B2

(12) United States Patent
Nielsen et al.

(10) Patent No.: US 11,879,445 B2
(45) Date of Patent: Jan. 23, 2024

(54) SUBMERSIBLE PUMP ASSEMBLY AND METHOD FOR OPERATING THE SUBMERSIBLE PUMP ASSEMBLY

(71) Applicant: GRUNDFOS HOLDING A/S, Bjerringbro (DK)

(72) Inventors: Carsten Nielsen, Bjerringbro (DK); Christoffer Nedergaard, Bjerringbro (DK); Kjeld Vinther Jacobsen, Bjerringbro (DK); Karsten Dyrbye, Bjerringbro (DK); John Jessen Gammelgaard, Bjerringbro (DK)

(73) Assignee: GRUNDFOS HOLDING A/S, Bjerringbro (DK)

( * ) Notice: Subject to any disclaimer, the term of this patent is extended or adjusted under 35 U.S.C. 154(b) by 696 days.

(21) Appl. No.: 16/884,594

(22) Filed: May 27, 2020

(65) Prior Publication Data
US 2020/0378374 A1    Dec. 3, 2020

(30) Foreign Application Priority Data
May 28, 2019  (EP) .................................... 19176901

(51) Int. Cl.
*F04B 17/04*    (2006.01)
*F04D 13/06*    (2006.01)
(Continued)

(52) U.S. Cl.
CPC .......... *F04B 17/04* (2013.01); *E21B 17/0283* (2020.05); *E21B 47/008* (2020.05);
(Continued)

(58) Field of Classification Search
CPC ...... F04B 17/04; F04B 49/06; F04D 13/0686; F04D 13/0693; F04D 13/08;
(Continued)

(56) References Cited

U.S. PATENT DOCUMENTS

| 4,244,229 A * | 1/1981 | Pullen ..................... G01L 9/007 |
| | | 73/722 |
| 5,521,592 A * | 5/1996 | Veneruso ................ E21B 47/13 |
| | | 340/855.8 |

(Continued)

FOREIGN PATENT DOCUMENTS

| CN | 101397901 A | 4/2009 |
| CN | 207556743 U | 6/2018 |

(Continued)

*Primary Examiner* — Dominick L Plakkoottam
(74) *Attorney, Agent, or Firm* — McGlew and Tuttle, P.C.

(57) ABSTRACT

A submersible pump assembly (1) includes a submersible pump (2) with a housing (3), and a sensor capsule (4) with a hermetically sealed casing (5). The sensor capsule (4) is releasably mountable at a sensor position (6) located at an outer face (7) of the housing (3) of the submersible pump (2). The submersible pump (2) includes a primary coil (8) within the housing (3). The sensor capsule (4) includes a secondary coil (9) within the casing (5). The primary coil (8) and the secondary coil (9) are arranged to be inductively coupled with each other for wirelessly transferring data and/or power through the housing (3) and the casing (5) when the sensor capsule (4) is mounted at the sensor position (6).

21 Claims, 8 Drawing Sheets

(51) Int. Cl.
*F04D 15/00* (2006.01)
*F04D 29/62* (2006.01)
*F04D 29/64* (2006.01)
*F04D 13/08* (2006.01)
*G01D 11/24* (2006.01)
*E21B 17/02* (2006.01)
*E21B 47/008* (2012.01)
*E21B 47/017* (2012.01)

(52) U.S. Cl.
CPC ........ *E21B 47/017* (2020.05); *F04D 13/0686* (2013.01); *F04D 13/0693* (2013.01); *F04D 13/08* (2013.01); *F04D 15/0088* (2013.01); *F04D 29/628* (2013.01); *F04D 29/648* (2013.01); *G01D 11/245* (2013.01); *F05D 2270/80* (2013.01)

(58) Field of Classification Search
CPC .. F04D 15/0088; F04D 29/628; F04D 29/648; F04D 13/0606; F04D 15/00; G01D 11/245; F05D 2270/80; G01L 19/149; E21B 47/13; E21B 47/06; E21B 47/017; E21B 47/12; E21B 17/028; E21B 17/0283; E21B 43/121; E21B 47/008
See application file for complete search history.

(56) References Cited

U.S. PATENT DOCUMENTS

| | | | | |
|---|---|---|---|---|
| 6,061,000 A | * | 5/2000 | Edwards | ................ E21B 47/13 340/854.6 |
| 8,056,619 B2 | * | 11/2011 | Patel | .................... E21B 17/028 166/242.7 |
| 9,175,523 B2 | * | 11/2015 | Patel | .................. E21B 41/0035 |
| 2004/0154390 A1 | | 8/2004 | Baustad | |
| 2007/0295504 A1 | * | 12/2007 | Patel | ..................... E21B 47/006 322/14 |
| 2008/0093922 A1 | * | 4/2008 | Layton | .................. E21B 17/028 307/3 |
| 2009/0084543 A1 | | 4/2009 | Fitzgerald | |
| 2009/0211755 A1 | * | 8/2009 | Dyer | ...................... E21B 43/20 166/252.1 |
| 2010/0011853 A1 | * | 1/2010 | Anthony | ............... E21B 47/017 73/152.02 |
| 2010/0139388 A1 | | 6/2010 | Griffiths et al. | |
| 2011/0017468 A1 | * | 1/2011 | Birch | .................... E21B 43/103 166/369 |
| 2015/0310724 A1 | | 10/2015 | Roberge | |
| 2016/0123830 A1 | | 5/2016 | Brown et al. | |
| 2016/0319653 A1 | * | 11/2016 | Reeves | ...................... E21B 43/121 |
| 2017/0074048 A1 | * | 3/2017 | Patel | ...................... E21B 47/06 |
| 2018/0017416 A1 | | 1/2018 | Haldorsen | |
| 2021/0358295 A1 | * | 11/2021 | Dinkins | ................. E21B 47/008 |

FOREIGN PATENT DOCUMENTS

| | | | | | |
|---|---|---|---|---|---|
| EP | 1452739 A1 | * | 9/2004 | ............. | F04D 15/00 |
| GB | 2333792 A | * | 8/1999 | ........... | E21B 17/028 |
| GB | 2361846 A | * | 10/2001 | ............ | E21B 47/01 |
| WO | 2007003445 A1 | | 1/2007 | | |
| WO | 2014154500 A1 | | 10/2014 | | |

* cited by examiner

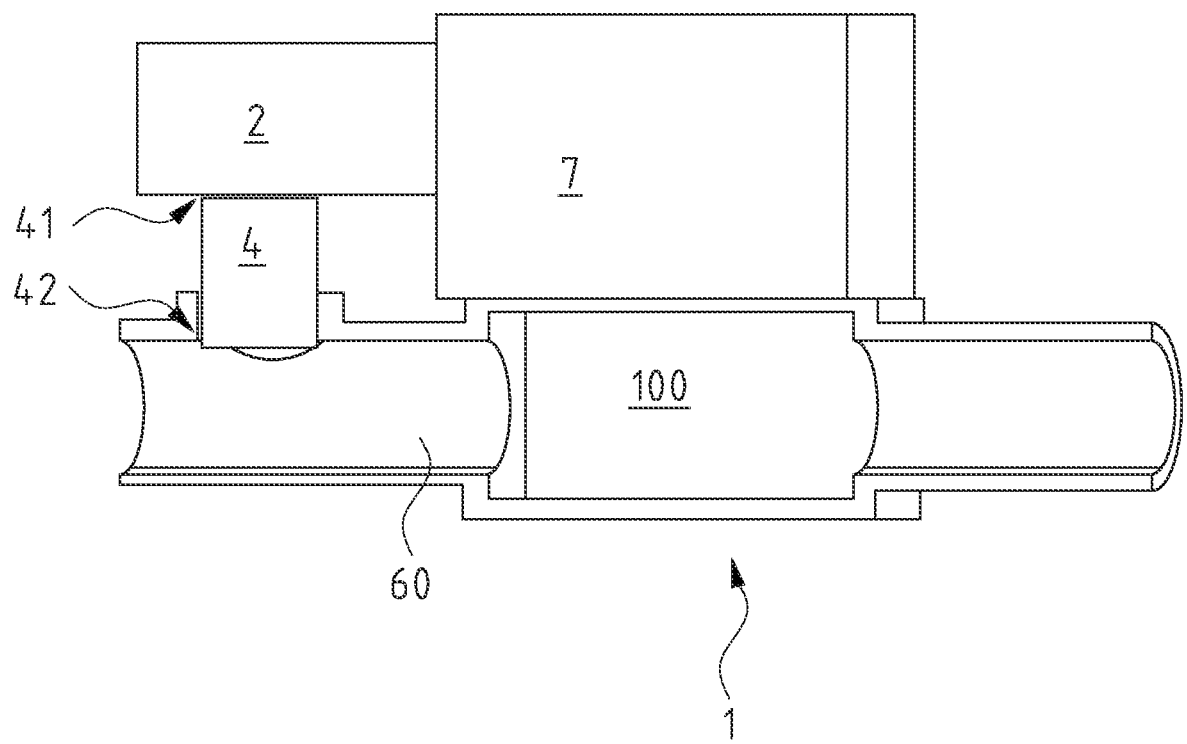

SUBMERSIBLE PUMP ASSEMBLY AND METHOD FOR OPERATING THE SUBMERSIBLE PUMP ASSEMBLY

CROSS REFERENCE TO RELATED APPLICATIONS

This application claims the benefit of priority under 35 U.S.C. § 119 of European Application 19 176 901.7, filed May 28, 2019, the entire contents of which are incorporated herein by reference.

TECHNICAL FIELD

The present invention is directed to a submersible pump assembly, and a method for operating a submersible pump assembly.

TECHNICAL BACKGROUND

WO 2014/154500 A1 discloses a device for detecting pressures in a fluid line comprising a housing part, which can be connected to a fluid line and has a measurement channel, into which a sensor module for pressure measurement is introduced, which is connected to a transmission module for wireless transfer of the measurement data detected by the sensor module, wherein the device is designed for external wireless power supply of that sensor module by a reading device. The housing part is provided with a cap at its end opposite the measuring channel, wherein the cap is made of plastic. The reading device comprise an antenna.

The housing part and the sensor module are adapted to sustain the pressure that is present in the fluid line to which the device for detecting pressures is to be connected. However, the device for detecting pressures is not adapted to sustain pressures as being present if the device would be submersed in a liquid. In particular, the cap is not adapted to sustain large pressures, mechanical stress due to, e.g., vibration, or heat. The device for detecting pressures cannot be removed from the fluid line without interrupting the fluid line to transport fluid.

SUMMARY

In contrast to such known devices for detecting pressures, embodiments of the present disclosure provide a submersible pump assembly which is entirely capable to sustain large pressures as being present in a fluid in which the submersible pump assembly is to be submersed, mechanical stress, and/or heat, and which is capable to provide an improved wireless communication between its components during operation of the submersible pump assembly. Further embodiments of the present disclosure provide a method for operating such a submersible pump assembly.

The principal idea underlying the present disclosure for achieving this is to provide a submersible pump assembly, comprising a submersible pump and a hermetically sealed sensor capsule, wherein the sensor capsule is mountable so that a primary coil of the submersible pump and a secondary coil of the sensor capsule can effectively and wirelessly transfer data and/or power between the submersible pump and the sensor capsule.

In accordance with a first aspect of the present disclosure, a submersible pump assembly is provided, the submersible pump assembly comprises a submersible pump with a housing, and
a sensor capsule with a hermetically sealed casing, wherein the sensor capsule is releasably mountable at a sensor position located at an outer face of the housing of the submersible pump,
wherein the submersible pump comprises a primary coil within the housing and the sensor capsule comprises a secondary coil within the casing,
wherein the primary coil and the secondary coil are arranged to be inductively coupled with each other for wirelessly transferring data and/or power through the housing and the casing when the sensor capsule is mounted at the sensor position.

Such a submersible pump assembly comprises submersible components, which are adapted to sustain pressures as being present in a liquid in which the submersible pump assembly is to be submersed. The hermetically sealed sensor capsule can be mounted at a sensor position to couple the primary coil and the secondary coil for power and/or data transmission. The inductive coupling between the coils makes it possible to hermetically seal the sensor capsule, i.e., to prevent, even under pressure from a surrounding liquid, any liquid from entering the sensor capsule and to avoid any problems due to moisture within the sensor capsule. Due to the inductive coupling between the submersible pump and the sensor capsule any cables or wires to transmit data and/or power to and/or from the sensor capsule can be dispensed with.

The primary coil is located in the pump housing and the secondary coil is located in the sensor casing. By mounting the sensor capsule in the sensor position, the primary coil and the secondary coil can be coupled for inductive power and/or data transmission. The transmission of data and/or power is done via a coil-to-coil arrangement, wherein one coil is the secondary coil in the sensor capsule and the other coil is the primary coil in the housing of the submersible pump which serves as a host device. The use of coils improves the transfer of power and/or data, in particular through the housing and the casing which are arranged between the coils. The power and/or data transmission from and/or to the sensor capsule can be achieved without any physical connectors, cables, batteries and/or opening the sensor capsule or disassembling the submersible pump assembly.

The releasable mounting of the sensor capsule in the sensor position allows an effective service of the pump assembly. In particular, the sensor capsule can be exchanged without disassembling the submersible pump.

Optionally, an inner face of the housing may comprise a housing recess, wherein the primary coil is arranged in the housing recess. Such a housing recess allows an effective positioning of the primary coil to be oriented by the housing recess towards the sensor position. Thereby, the primary coil is positioned in a preferable manner to be coupled with the secondary coil when the sensor capsule is mounted in the sensor position.

Optionally, an inner face of the casing may comprise a casing recess, wherein the secondary coil is arranged in the casing recess. Such a casing recess allows an effective positioning of the secondary coil, so that the secondary coil is positioned in a preferable manner to be coupled with the primary coil when the sensor capsule is mounted in the sensor position. Preferably, the casing comprises the casing recess and the housing comprises the housing recess, to provide an effective alignment of the coils.

Optionally, the distance between the primary coil and the secondary coil may be less than 5 mm, preferably less than 3 mm, when the sensor capsule is mounted at the sensor position. Such a distance between the primary coil and the secondary coil allows a reliable mounting and at the same time a sufficient inductive coupling between the primary coil and the secondary coil. The housing and the casing are located between the primary coil and the secondary coil and a minimum distance of 2 mm, preferably 1 mm, and even more preferably 0.5 mm, is advantageous to achieve a robust hermetically sealed sensor capsule which is capable to sustain large pressures and mechanical stress. The distance between the primary coil and the secondary coil preferably coincide with the distance between bases of essentially cylindrical recesses in the housing and the casing in which the coils are mountable.

Optionally, the primary coil may have a primary magnetic axis and the secondary coil may have a secondary magnetic axis, wherein the secondary magnetic axis is coaxially and/or in parallel aligned with the primary magnetic axis, when the sensor capsule is mounted at the sensor position. This allows an efficient magnetic coupling between the primary coil and the secondary coil with an optimized degree of transmission of power and/or data. Advantageously, the alignment of the magnetic axes can effectively be achieved by providing essentially cylindrical recesses in the casing and the housing.

Optionally, the submersible pump assembly may further comprise a securing member embracing the sensor capsule. The securing member may preferably assist the mounting and/or alignment of the sensor capsule in the sensor position. The securing member can be mounted to an outer face of the housing and comprises an embracing section, such as a channel or a recess, for embracing the sensor capsule, in particular at the sensor position. The securing member protects the sensor capsule from impacts during operation of the pump assembly, e.g., in a bore hole.

Optionally, the sensor capsule may define a longitudinal axis extending from a first sensor capsule portion being releasably mountable at the sensor position to a second sensor capsule portion, wherein the sensor capsule is circumferentially embraced by the securing member, and wherein the securing member defines a channel for fluid communication between the second sensor capsule portion and an ambient fluid in which the submersible pump is configured to be submersed. This defines a preferred geometry of the sensor capsule and the securing member. The securing member comprises the channel through which the sensor capsule can be guided preferably parallel to the longitudinal axis so that the sensor capsule can be mounted with its first sensor capsule portion at the sensor position. The fluid communication through the channel can be used to improve the sensing capabilities of the sensor capsule.

Optionally, the securing member may comprise a filter, a damping element and/or an obstacle being arranged in a channel for fluid communication between the second sensor capsule and an ambient fluid in which the submersible pump is configured to be submersed. The fluid can in particular be a liquid. Such a filter, damping element and/or obstacle can be used to improve the capability of the sensor capsule to perform reliable measurements and/or to protect the sensor capsule from environmental conditions. A damping element and/or an obstacle can avoid a water hammer and/or a cavitation near the sensor capsule. The filter, damping element, and/or obstacle can be an integral element of the securing member or a separate part that can be removed from the securing member, e.g., for cleaning. The filter, damping element and/or obstacle protects the sensor capsule from impacts during operation of the pump assembly in a bore hole, from particles which are suspended in the liquid in which the submersible pump assembly is to be submersed, and supports an effective measurement of the temperature of the liquid by minimizing a potential temperature influence from the submersible pump.

Optionally, the securing member may be made of plastic or composite material to provide a costeffective embodiment of a securing member which can be costefficiently manufactured and mounted. The securing member may comprise sections which are made of a material other than plastic or composite material, e.g. metal, in particular steel.

Optionally, the housing and/or the casing may comprise a transmission section at the sensor position, the transmission section comprising stainless steel, glass, and/or a metal with an electrical conductivity less than $10^7$ A/(Vm), preferably less than $8 \times 10^6$ A/(Vm), more preferably less than $2 \times 10^6$ A/(Vm). Such a transmission section is beneficial in view of the sensor capsule being hermetically sealed on the one hand and sufficiently transparent for electromagnetic coupling on the other hand.

Optionally, the housing and/or the casing may comprise a transmission section at the sensor position, the transmission section comprising stainless steel, glass, and/or a metal with a relative magnetic permeability below 5, preferably below 2. Again, such a transmission section is beneficial in view of the sensor capsule being hermetically sealed on the one hand and sufficiently transparent for electromagnetic coupling on the other hand.

Optionally, the submersible pump assembly may further comprise an electronic control unit configured to scan primary coil operation frequencies for operating the primary coil at a frequency fulfilling a first condition that the power transmission efficiency is above a minimum power transmission efficiency and fulfilling a second condition that the signal-to-noise ratio is above a minimum signal-to-noise ratio. This improves the transmission efficiency that can depend on the precise position of the sensor capsule when being mounted at the sensor position. Remarkably, the resonance frequency of the primary coil and/or the secondary coil provides an optimal transmission efficiency but, however, does not provide the best choice for the transfer of power and/or data as the signal-to-noise ratio at this frequency is often too small, in particular when communicating from the sensor capsule to the submersible pump. A better frequency as a compromise between a sufficient transmission efficiency and a sufficient signal-to-noise ratio may be found by the scan of the primary coil operation frequency. In detail, in particular when the submersible pump and/or any of its components is powered up, the scan may be performed by a relatively coarse and broad frequency sweep which finds the maximum power point (mpp), i.e. the frequency for which the power transmission is most efficient and the first condition is fulfilled. This is followed by a narrower and finer search for an operation frequency, which fulfills the second condition close to and typically below the maximum power point. Preferably, the electronic control unit may be configured to repeat the scan procedure when the power transmission is reevaluated and found not to fulfill the first and/or the second condition. The power transmission may be reevaluated on a continuous, regular or event-triggered basis.

Optionally, the casing of the sensor capsule may have an essentially cylindrical shape defining a longitudinal axis, wherein the secondary coil defines a magnetic axis in parallel to the longitudinal axis of the casing to improve the alignment of the secondary coil with the primary coil and a positioning and alignment of the sensor capsule. The sensor capsule can be mounted with one end in an outer housing recess in order to achieve an effective alignment of the longitudinal axis and/or the second magnetic axis.

Optionally, the sensor capsule may define a longitudinal axis extending from a first sensor capsule portion being releasably mountable at the sensor position to a second sensor capsule portion, wherein the first sensor capsule portion comprises sensor electronics and the second sensor capsule portion comprises a sensing element. This embodiment improves an effective mounting of the sensor capsule in the sensor position so that the first sensor capsule portion which comprises the secondary coil is mounted with relation to the housing which comprises the primary coil to allow an effective magnetic coupling between the primary coil and the secondary coil. At the same time, the second sensor capsule portion can be arranged in relation to the fluid which properties are to be sensed by the sensing element.

Optionally, the submersible pump may have an essentially cylindrical shape defining a longitudinal axis for being oriented essentially along a vertical direction during pump operation and having a bottom end, wherein the sensor position is located at an outer face of the bottom end of the housing of the submersible pump to allow an effective mounting of the submersible pump assembly.

Optionally, the sensor capsule may comprise sensor electronics within the hermetically sealed casing, wherein the sensor electronics are configured to generate a pump control command, for example an on/off switching command or a pump speed command, and to wirelessly send said pump control command from the secondary coil through the housing and the casing to the primary coil. This embodiment improves the control of the submersible pump. The submersible pump can be controlled in dependence on properties of the liquid in which the submersible pump assembly is submersed and which are sensed by the sensor capsule.

According to another aspect of the present disclosure, a method for operating a submersible pump assembly is provided, the method comprising the following steps:
mounting a sensor capsule with a hermetically sealed casing at a sensor position located at an outer face of a housing of a submersible pump such that a primary coil within the housing and a secondary coil within the casing are arranged to be inductively coupled with each other, and
wirelessly transferring data and/or power by an inductive coupling between the primary coil and the secondary coil through the housing and the casing.

The hermetically sealed sensor capsule can be mounted at the outer face of the housing to be mountable at a sensor position to couple the primary coil and the secondary coil for power and/or data transmission. The inductive coupling between the coils makes it possible to hermetically seal the sensor capsule and any cables or wires to transmit data and/or power to and/or from the sensor capsule can be dispensed with.

The electronics of the submersible pump assembly comprise the primary coil which is located in the pump housing and the secondary coil which is located in the sensor casing. By mounting the sensor capsule at the outer face of the pump housing, the primary coil and the secondary coil can be coupled for inductive power and/or data transmission.

Optionally, the step of wirelessly transferring data and/or power may comprise generating a primary coil operation frequency in the range of 0.5 kHz to 200 kHz, preferably in the range of 1 kHz to 100 kHz, more preferably in the range of 5 kHz to 50 kHz to provide a particularly effective inductive coupling between the primary coil and the secondary coil, wherein it is considered that the pump housing and the sensor casing are arranged between the primary coil and the secondary coil, and wherein the sensor casing and/or the pump housing can be made of electrically conducting materials.

Optionally, the method may further comprise steps of scanning operation frequencies and finding an operation frequency fulfilling a first condition that the power transmission efficiency is above a minimum power transmission efficiency and fulfilling a second condition that the signal-to-noise ratio is above a minimum signal-to-noise ratio. This improves the transmission efficiency that can depend on the precise position of the sensor capsule when being mounted at the sensor position. Scanning operation frequencies and finding the operation frequency which fulfills the first condition and the second condition may be part of a so-called "handshake" between the submersible pump and the sensor capsule, and which preferably precedes the actual power and/or data transfer between the submersible pump and the sensor capsule. Scanning operation frequencies and finding the operation frequency can be repeated during operation of the submersible pump assembly when any of the conditions is not fulfilled anymore.

Optionally, the method may further comprise a step of generating a pump control command, for example an on/off switching command or a pump speed command, by sensor electronics within the hermetically sealed casing of the sensor capsule, and wherein the step of wirelessly transferring data and/or power comprises sending said pump control command from the secondary coil to the primary coil pump. This embodiment improves the control of the submersible pump. The submersible pump can be controlled depending on properties of the liquid in which the submersible pump assembly is submersed and which are sensed by the sensor capsule.

Optionally, the step of mounting may trigger uploading data, such as a pump configuration or software update, from the secondary coil to the primary coil. So, such data may be automatically uploaded to the pump by mounting the sensor. The sensor may for instance query the pump if a software update is needed and start an upload of the update if need be.

Embodiments of the present disclosure will now be described by way of example with reference to the following figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 12 is schematic view of an alternative integration of the sensor capsule.

DESCRIPTION OF PREFERRED EMBODIMENTS

Figure 1:
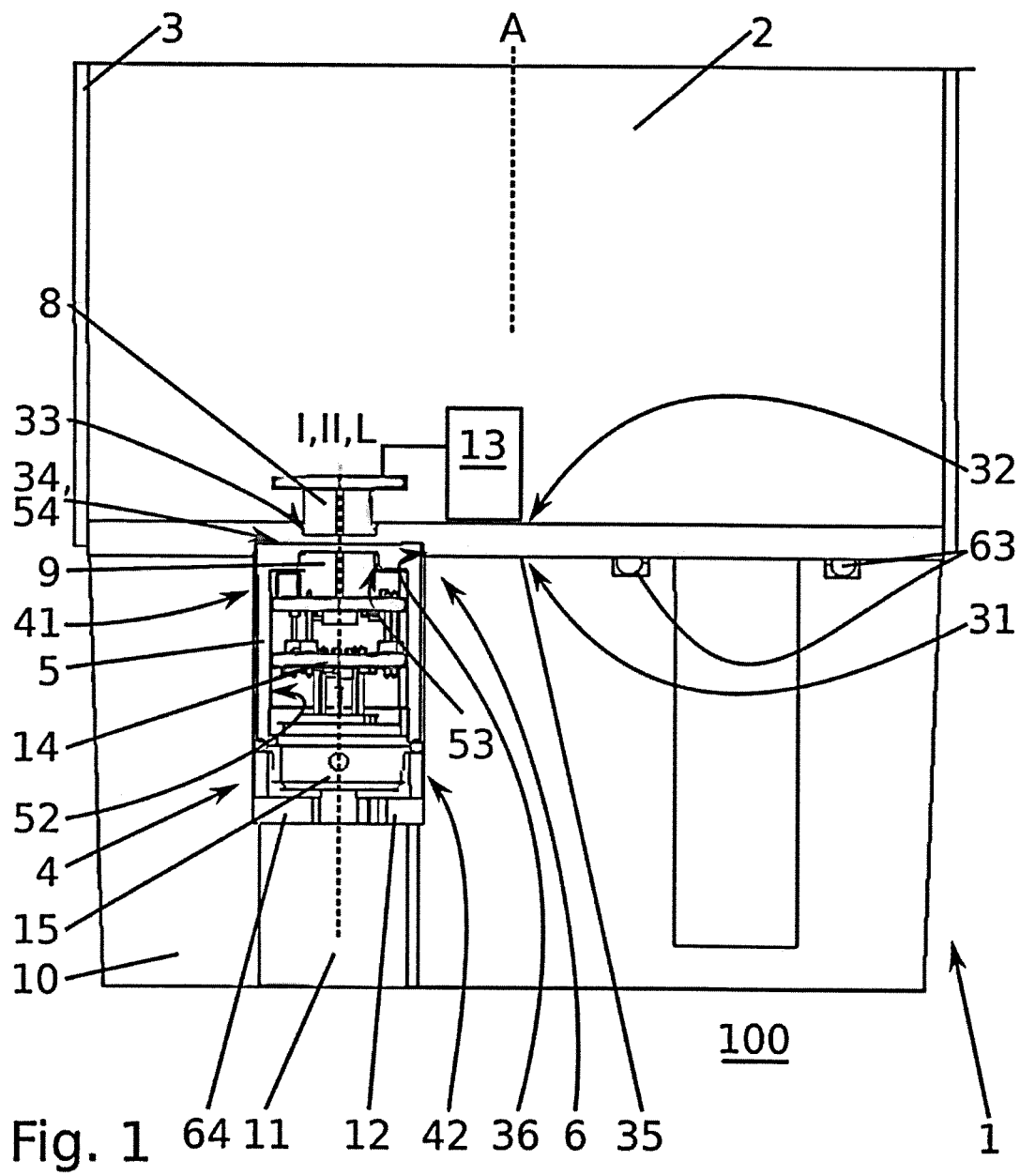
FIG. 1 is a partial longitudinal cut view of an embodiment of a submersible pump assembly disclosed herein.

Referring to the drawings, FIG. 1 shows a submersible pump assembly 1. The submersible pump assembly 1 comprises a submersible pump 2 with a housing 3. The submersible pump assembly 1 is adapted to be submersed in a liquid 100, for example water, in particular fresh water and/or sea water. The liquid 100 exerts a pressure on the components of the submersible pump assembly 1. The submersible pump 2 and the housing 3 are adapted to sustain the pressure which is exerted by the liquid 100 in which the submersible pump assembly 1 is or is to be submersed. The submersible pump 2 is adapted to pump the liquid 100.

The submersible pump assembly 1 further comprises a sensor capsule 4 with a hermetically sealed casing 5. The hermetic sealing of the casing 5 ensures that the sensor capsule 4 is submersible in the liquid 100 while the sensor capsule 4 can sustain the pressure in the liquid 100 without any liquid 100 entering the sensor capsule 4 and/or causing moisture problems. The casing 5 fully encases the components in the interior of the sensor capsule 4, e.g., sensor electronics 14 and a sensing element 15. The sensing element 15 can be adapted to sense at least one of the following properties: pressure, temperature, salinity, pH, and/or a concentration of another substance which is present in the liquid 100. The sensing element 15 can also comprise an accelerometer and/or an orientation sensor.

The submersible pump 2 comprises a primary coil 8 within the housing 3 and the sensor capsule 4 comprises a secondary coil 9 within the casing 5. The primary coil 8 and the secondary coil 9 are arranged to be inductively coupled with each other for wirelessly transferring data and/or power through the housing 3 and the casing 5 when the sensor capsule 4 is mounted at a sensor position 6. The sensor position 6 is arranged so that an efficient transfer of data and/or power between the submersible pump 2 and the sensor capsule 4 is guaranteed, i.e. between the primary coil 8 and the secondary coil 9. In this embodiment, the sensor position 6 is geometrically defined by an outer housing recess 36 at an outer face 31 of the housing 3 and/or by a securing member 10 which is attached to a bottom end 35 of the housing 3.

The housing 3 has an inner face 32, and the inner face 32 comprises a housing recess 33, wherein the primary coil 8 is arranged in the housing recess 33. The housing recess 33 improves the alignment of the primary coil 8 with respect to the sensor position 6, and improves the mountability of the primary coil 8 within the housing 3. Preferably, the housing recess 33 comprises an essentially cylindrical shape with a lateral face and a flat base, wherein the primary coil 8 is circumferentially embraced by the lateral face and aligned with respect to the flat base. That is, the primary coil 8 comprises a primary magnetic axis I, and the magnetic axis I is perpendicular to the flat base of the housing recess 33.

The casing 5 has an inner face 52, and the inner face 52 comprises a casing recess 53, wherein the secondary coil 9 is arranged in the casing recess 53. The casing recess 53 improves the alignment of the secondary coil 9 with respect to the primary coil 8 when the sensor capsule 4 is mounted in the sensor position 6, and improves the mountability of the secondary coil 9 within the casing 5. Preferably, the casing recess 53 comprises an essentially cylindrical shape with a lateral face and a flat base, wherein the secondary coil 8 is circumferentially embraced by the lateral face and aligned with respect to the base. That is, the secondary coil 9 comprises a secondary magnetic axis II, and the magnetic axis II is perpendicular to the flat base of the casing recess 53.

The housing 3 comprises an outer housing recess 36 at the outer face 31 of the housing 3 to improve the mountability of the sensor capsule 4 in the sensor position 6. Preferably, the outer housing recess 36 has a shape that matches the shape of the casing 5. For example, if the casing 5 has a cylindrical shape, the outer housing recess 36 has also a cylindrical shape so dimensioned that the sensor capsule 4 can be at least partially inserted in the outer housing recess 36. In the sensor position 6, the secondary magnetic axis II is in parallel alignment with the primary magnetic axis I, when the sensor capsule 4 is mounted at the sensor position 6. This allows a particularly effective transmission of power and/or data between the primary coil 8 and the secondary coil 9.

The submersible pump assembly 1 comprises a securing member 10. The securing member 10 comprises a channel 11. The channel 11 is proportioned so that the sensor capsule 4 can be guided through the channel 11 and be mounted at the sensor position 6. At the sensor position 6, the sensor capsule 4 is embraced by the securing member 10 and supported by a mounting member 64. The mounting member 64 assists to guide the sensor capsule 4 to the sensor position 6 and can lock the sensor capsule 4 at the sensor position 6. The mounting member 64 can be separate from the securing member 10 and can be movable, i.e., shiftable and/or rotatable, from a passthrough position allowing the sensor capsule 4 to move through the channel 11 to a locked position locking the sensor capsule 4 at the sensor position 6. The mounting member 64 can be made of an elastic material and/or comprise a spring, in particular to lock the sensor capsule 4 at the sensor position 6. The mounting member 64 can be adapted to releasably mount the sensor capsule 4 at the sensor position 6 within the channel 11.

The housing 3 and/or the securing member 10 comprises at least one fastening member which are adapted to attach the securing member 10 to the bottom end 35 of the housing 3. For example, the fastening member can comprise at least one protrusion, recess, and/or a locking device which is arranged at the bottom end 35 of the housing 3 and adapted to attach the securing member 10. The fastening member can be used to facilitate the attachment of the housing 3 and the securing member 10 and/or improve the alignment of the securing member 10 with respect to the housing 3 so that the sensor capsule 4 can be mounted at the sensor position 6. The fastening member can be adapted to allow a releasable mounting of the securing member 10 and the housing 3. A sealing O-ring 63 is installed between the housing 3 and/or the securing member 10.

The sensor capsule 4 is releasably mountable at the sensor position 6 located at the outer face 31 of the housing 3 of the submersible pump 2. The releasable mounting of the sensor capsule 4 at the sensor position 6 is achieved by the releasable mounting of the securing member 10 to the housing 3 of the submersible pump 2 and/or by the releasable mounting of the sensor capsule 4 within the channel 11 of the securing member 10.

The submersible pump assembly 1 comprises an electronic control unit 13 which is shown only schematically and arranged within or at the submersible pump 2, for example within the housing 3 as shown in FIG. 1 or at an outer face 31 of the housing 3 (not shown). The electronic control unit 13 is configured to scan a primary coil operation frequency for operating the primary coil 8 and is explained in detail with respect to FIG. 9.

The sensor capsule 4 comprises sensor electronics 14 within the hermetically sealed casing 5 so that the sensor electronics 14 is protected from water, and/or mechanical and/or thermal stress. The sensor electronics 14 is inter alia configured to control measuring of the sensing element 15 and communicating with the submersible pump 2. The sensor electronics 14 is explained in detail with respect to FIG. 9.

Figure 2:
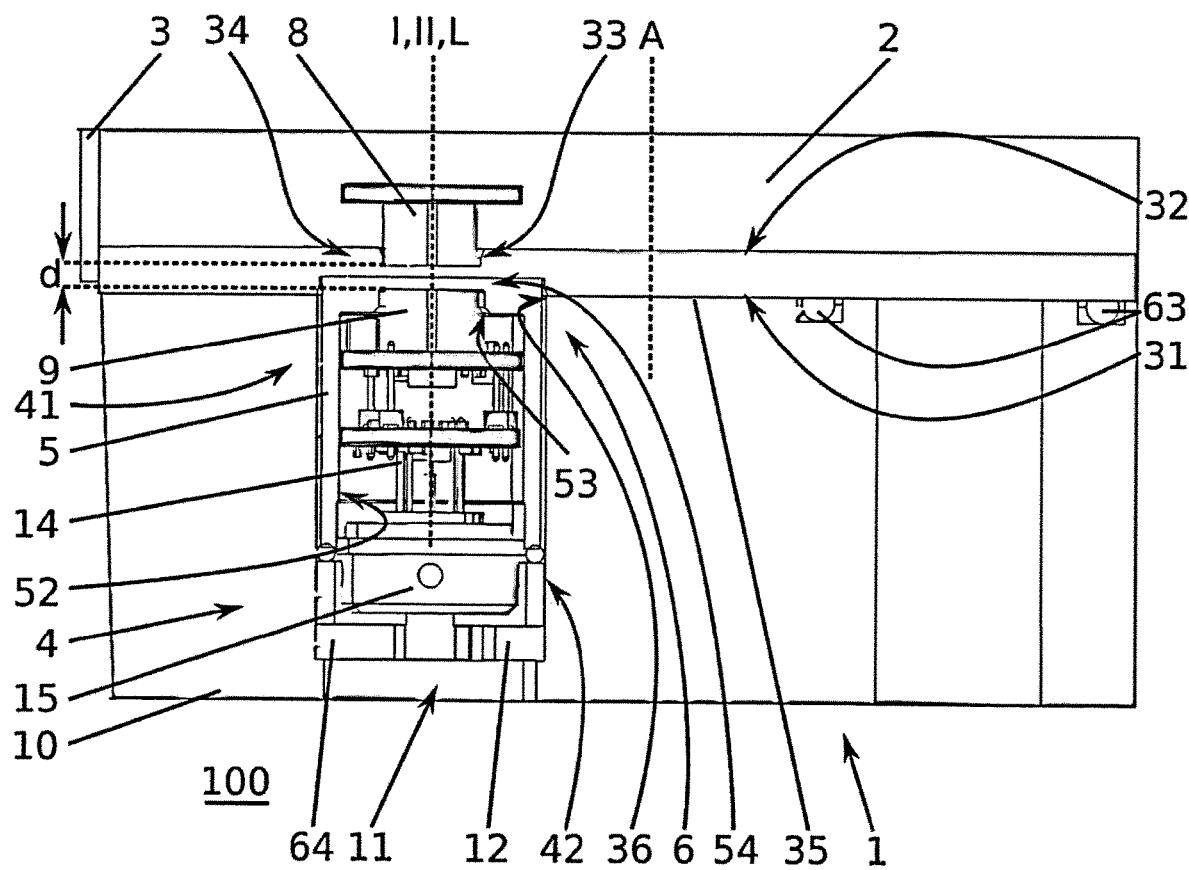
FIG. 2 is an enlarged view of the submersible pump assembly of FIG. 1.

FIG. 2 shows an enlarged view of the submersible pump assembly 1 of FIG. 1.

The submersible pump 2 has an essentially cylindrical shape which defines a longitudinal axis A for being oriented essentially along a vertical direction during pump operation. The submersible pump 2 has a bottom end 35, and the sensor position 6 is located at the outer face 31 of the bottom end 35. The bottom end 35 can be welded to the remaining housing 3 to hermetically close the volume within the pump 2. Preferably, the bottom end 35 and/or the housing 3 is made of metal.

The sensor capsule 4 has an essentially cylindrical shape and defines a longitudinal axis L which extends from a first sensor capsule portion 41 to a second sensor capsule portion 42, wherein the first sensor capsule portion 41 is releasably mounted at the sensor position 6. The longitudinal axis L is parallel to and coincides with the second magnetic axis II of the secondary coil 9 to achieve an improved transmission efficiency. At the sensor position 6, the second magnetic axis II is coaxially aligned with the primary magnetic axis I of the primary coil 8 to ensure an effective magnetic coupling between the primary coil 8 and the secondary coil 9. The alignment of the magnetic axes I, II is facilitated by the alignment of the longitudinal axis L of the sensor capsule 4 and the longitudinal axis A of the submersible pump 2, which are aligned when the sensor capsule 4 is mounted at the sensor position 6. The parallel alignment of the longitudinal axes A, L is supported by the shape of the securing member 10 and the channel 11, wherein the channel 11 has an essentially cylindrical shape and defines a longitudinal axis which is parallel to the longitudinal axis L of the submersible pump 2 when the securing member 10 is attached to the submersible pump 2.

The secondary coil 9 can collect power which is emitted from the primary coil 8 and vice versa. The power transfer is provided by means of induction. The induced field passes through interface sections 34, 54 of the housing 3 and the casing 5, respectively. Thus, the induced field passes through two layers which are given by the pump housing 3 and the sensor casing 5. The housing 3 comprises a housing transmission section 34 which is located at the housing recess 33. The casing 5 comprises a casing transmission section 54 which is located at the casing recess 53. The transmission sections 34, 54 are made of a material, e.g. stainless steel, which is suitable to guarantee the hermetic sealing of the sensor capsule 4 and allow an efficient magnetic coupling between the primary coil 8 and the secondary coil 9. The distance d between the primary coil 8 and the secondary coil 9 is less than 5 mm, preferably less than 3 mm, when the sensor capsule 4 is mounted at the sensor position 6.

Figure 3:
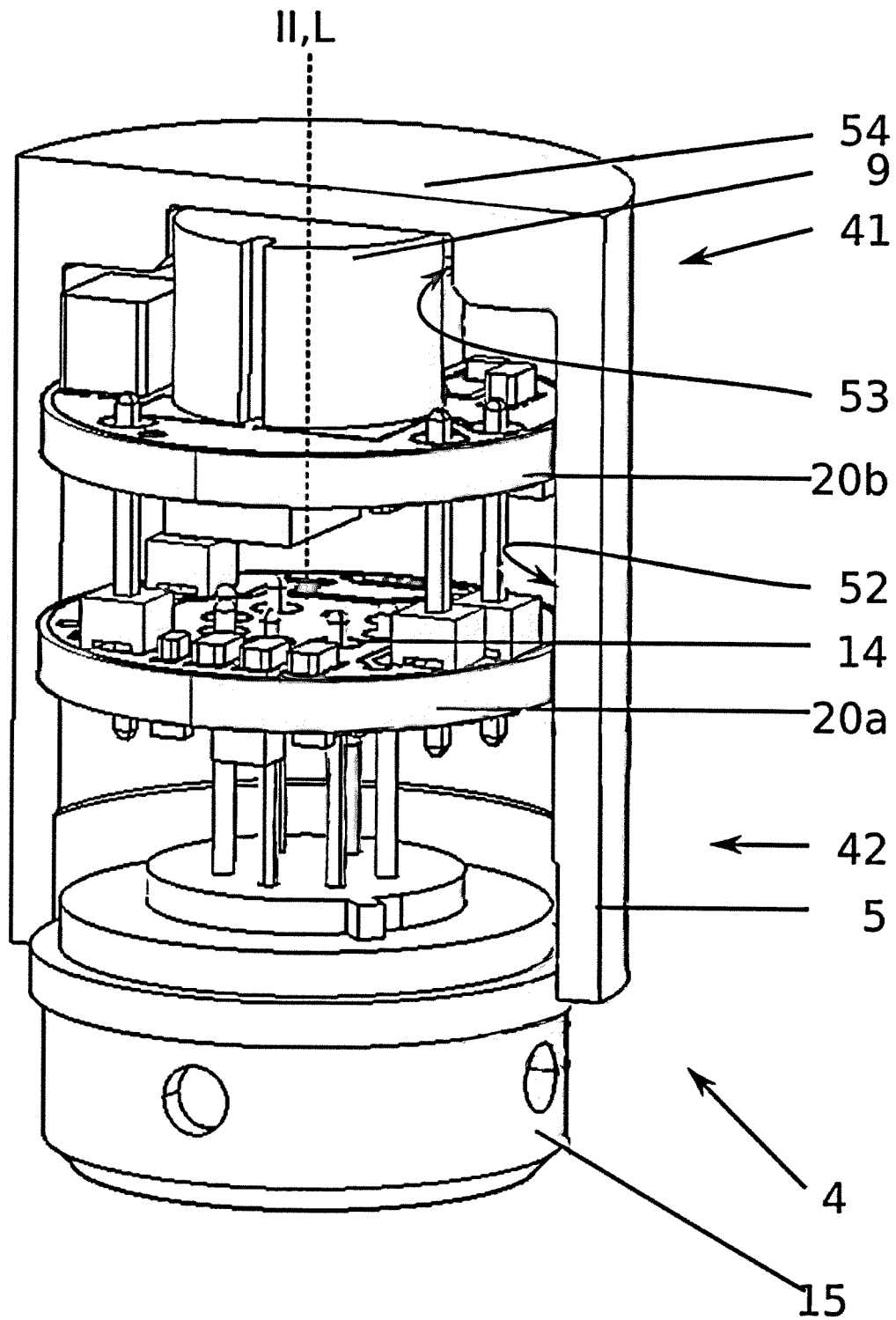
FIG. 3 is a half-cut perspective view of a sensor capsule as shown in FIGS. 1 and 2.

FIG. 3 shows the sensor capsule 4 as shown in the sensor position 6 in FIGS. 1 and 2. The casing 5 of the sensor capsule 4 is preferably made of stainless steel and/or comprises sections which are made of stainless steel. The sensor capsule 4 can comprise a flexible damping element (not shown) which is arranged between the secondary coil 9 and the casing 54 to absorb mechanical stress caused by thermal expansion, vibration, and/or pressure to avoid high stresses in the components of the sensor capsule 4.

The casing 5 is made as one part, wherein several sections are welded together. The casing 5 can also comprise several parts as shown in FIG. 4; for example one part can constitute the interface section 54 of the casing 5 which has a lower relative magnetic permeability and/or lower electrical conductivity than the remaining part of the casing 5 to reduce electromagnetic losses of the electromagnetic field which passes through the interface section 54, when the primary coil 8 and the secondary coil 9 are inductively coupled.

As shown in FIG. 3, the transmission section 54 is made of the same material as the casing 5. To improve an electromagnetic coupling of the secondary coil 9 with the primary coil 2 in the submersible pump 2 and to facilitate the alignment of the secondary coil 9, the casing 5 comprises a casing recess 53 which has a thinner wall thickness than the remaining wall thickness of the casing 5. Due to the reduced wall thickness of the casing 5 at the casing recess 53, electromagnetic radiation is shielded only poorly and an effective inductive coupling of the secondary coil 9 with the primary coil 9 is possible.

The sensor electronics 14 or at least one component thereof can be comprised by and/or arranged on one or more printed circuit boards 20a, 20b. Preferably, the printed circuit boards 20a, 20b comprise a size which is smaller than the size of the sensing element 15 to allow the assembly of the sensor capsule from one end and thereby make only one welding seam necessary. The sensor capsule 5 can be assembled by first introducing the secondary coil 9 into the casing 5 by moving the secondary coil along the longitudinal axis L towards the first sensor capsule portion 41 until the secondary coil 9 reaches the casing recess 53. Subsequently, the printed circuit boards 20a, 20b are introduced into the casing 5 by moving the printed circuit boards 20a, 20b along the longitudinal axis L towards the secondary coil 9 so that the printed circuit boards 20a, 20b reach a position which is defined by the geometry of the interior of the casing and so that the printed circuit boards 20a, 20b are supported by the inner face 52 of the sensor capsule 4. Finally, the sensor capsule 4 can be closed and be hermetically sealed by attaching the sensing element 15 to the second sensor capsule portion 42. In this example, the sensor capsule 4 comprises two printed circuit boards 20a, 20b. In alternative embodiments, the sensor capsule 4 can comprise one or more than two printed circuit boards 20a, 20b. The printed circuit boards 20a, 20b are spatially separated from each other, but electrically connected with each other. The printed circuit boards 20a, 20b, the secondary coil 9 and/or the sensing element 15 can also be assembled and tested separately to obtain a calibration data set before being introduced into the casing 5 and before being used in the submersible pump assembly 1.

Figure 4:
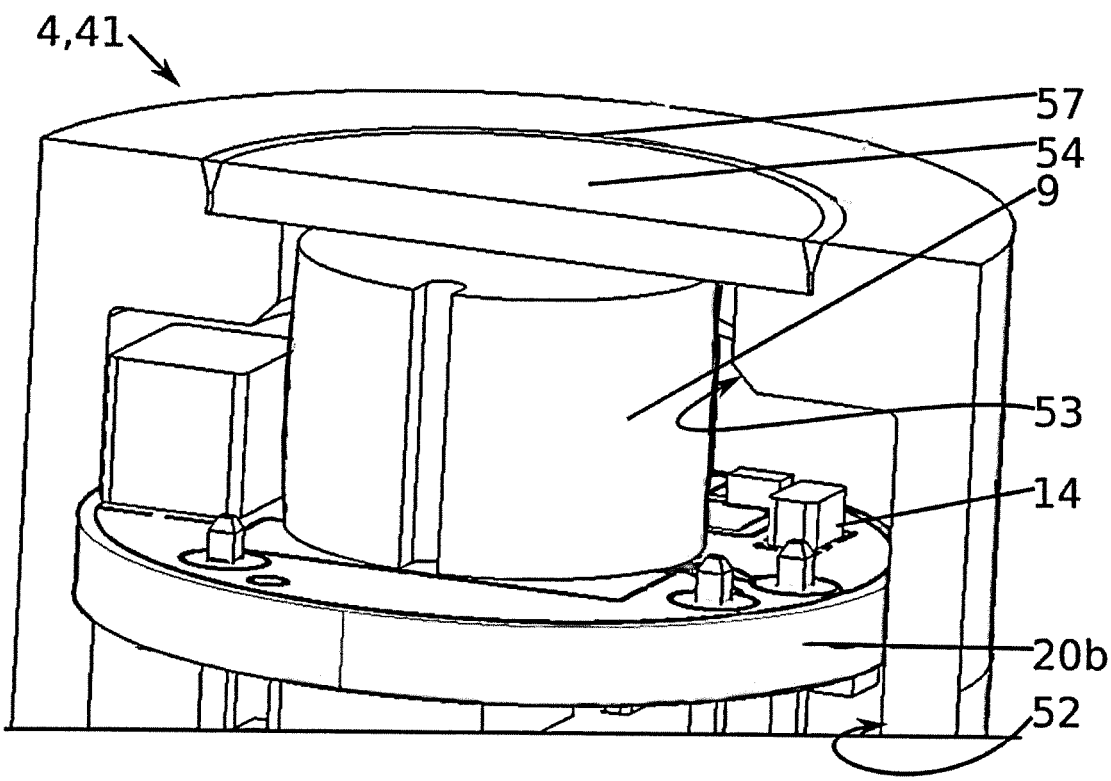
FIG. 4 is a partial half-cut perspective view of an alternative embodiment of a sensor capsule disclosed herein.

FIG. 4 shows an alternative embodiment of a sensor capsule 4 which will be explained with respect to the differences to the embodiment of the sensor capsule 4 which is shown in FIGS. 1 to 3. The casing transmission section 54 is made of a material other than the casing 5. For example, the casing 5 can be made of stainless steel, and the casing transmission section 54 can be made of a metal with an electric conductivity less than stainless steel, a metal with a relative magnetic permeability below 5, preferably below 2, glass, ceramics, and/or a composition thereof. The casing transmission section 54 which can also be called a membrane which ensures that the hermetic sealing of the sensor capsule 4 is not compromised and that the electromagnetic coupling of the primary coil 8 and the secondary coil 9 is guaranteed when the sensor capsule 5 is mounted in the sensor position 6. A casing 5 which is made of a polymer do not serve the purpose of hermetic sealing when the sensor capsule 4 is submersed. The casing transmission section 54 is arranged in the top plate of the cylindrical sensor capsule 5 at the first sensor capsule portion 41.

To improve the hermetic sealing of the sensor capsule 4 and/or to facilitate the mounting of the sensor capsule 4, the sensor capsule 4 can comprise a sealing element 57 which is arranged between the casing 5 and the casing transmission section 54. The sealing element 57 can be made of an elastic material to absorb mechanical stress caused by vibrations and/or thermal expansion of any component of the sensor capsule 4 and/or of the submersible pump 2.

Figure 5:
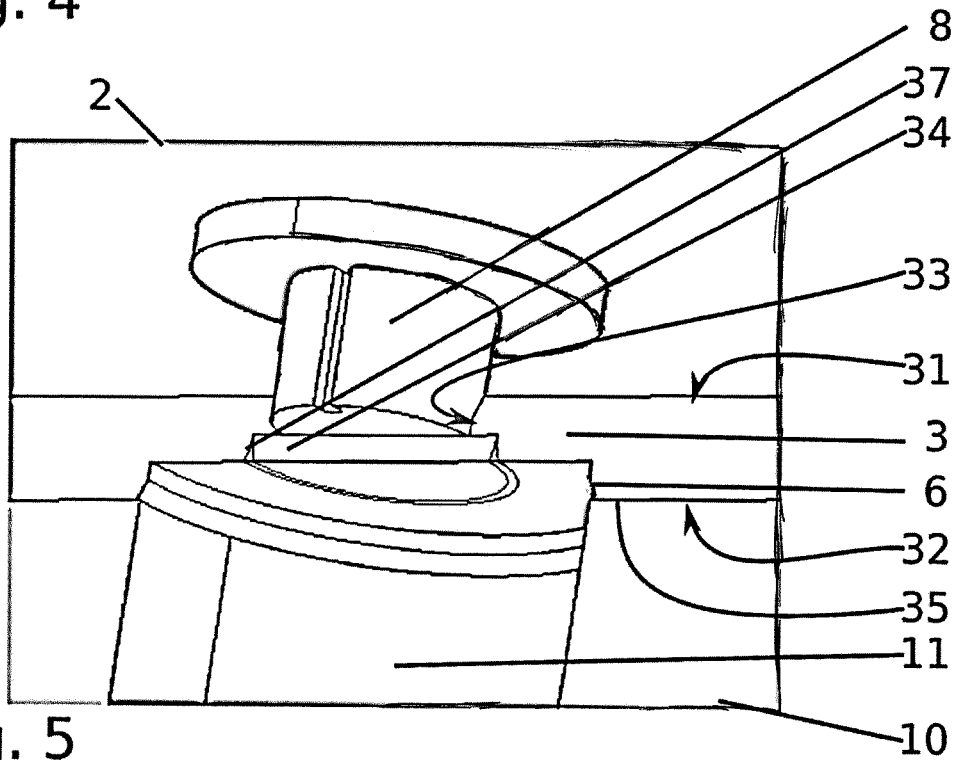
FIG. 5 is a partial half-cut perspective detail view of an alternative embodiment of a submersible pump disclosed herein.

FIG. 5 shows an alternative embodiment of a submersible pump 2 with a securing member 10 which will be explained with respect to the differences to the embodiment which is shown in FIGS. 1 and 2. The housing transmission section 34 is made of a material other than the housing 3. For example, the housing 3 can be made of stainless steel, and the housing transmission section 34 can be made of a metal with an electric conductivity less than stainless steel, a metal with a relative magnetic permeability below 5, preferably below 2, glass, ceramics, and/or a composition thereof. The housing transmission section 34 ensures that the hermetic sealing of the submersible pump 2 is not compromised and that the electromagnetic coupling of the primary coil 8 and the secondary coil 9 is guaranteed when the sensor capsule 5 is mounted in the sensor position 6. The housing casing transmission section 34 is arranged at the bottom end 35 of the housing 3.

To improve the hermetic sealing of the housing 3 and/or to facilitate the mounting of the housing 3, the housing 3 can comprise a sealing element 37 which is arranged between the housing 3 and the housing transmission section 34. The sealing element 37 can be made of an elastic material to absorb mechanical stress caused by vibrations and/or thermal expansion of any component of the sensor capsule 4 and/or of the submersible pump 2.

Figure 6:
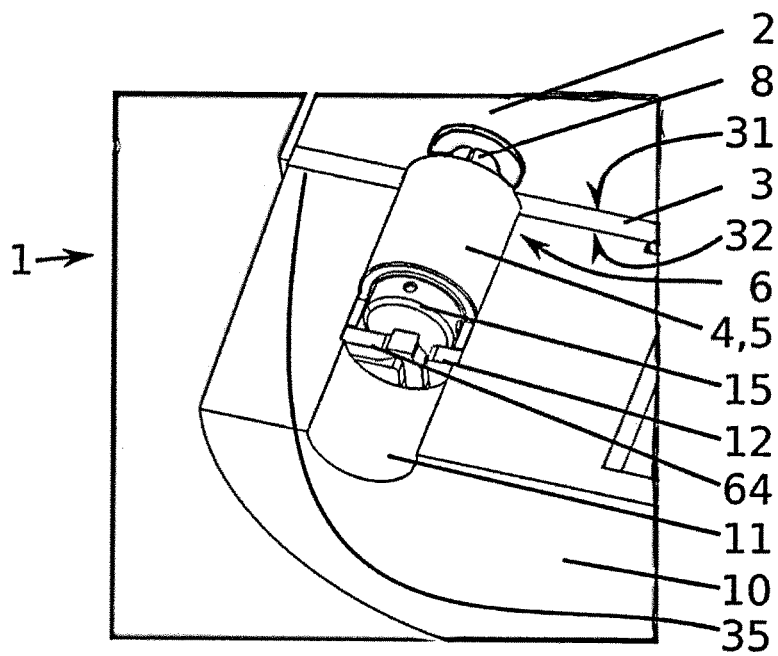
FIG. 6 is a partial half-cut perspective view of one of different embodiments of a submersible pump disclosed with different embodiments of securing members.
Figure 7:
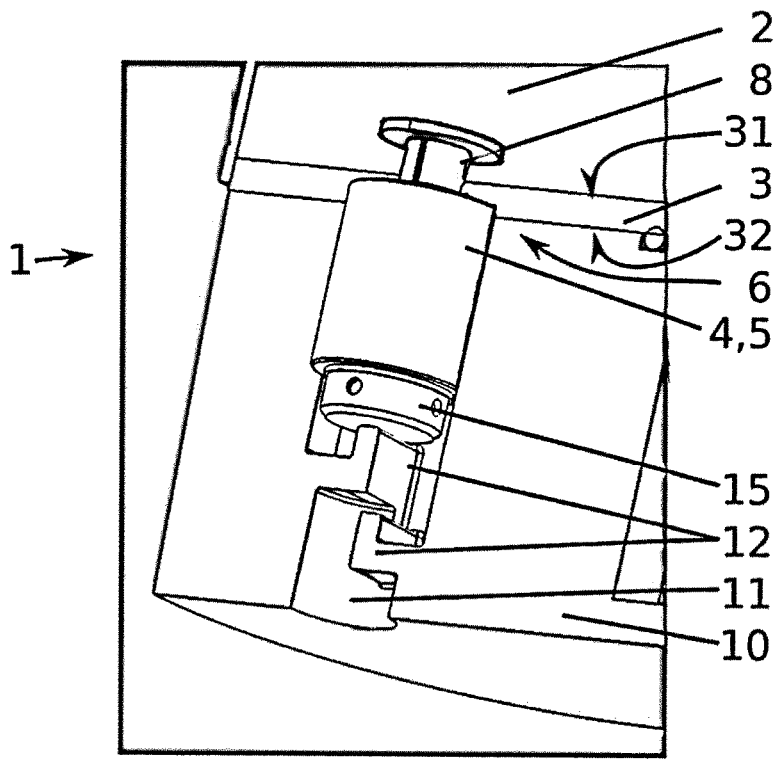
FIG. 7 is a partial half-cut perspective view of another of different embodiments of a submersible pump disclosed with different embodiments of securing members.
Figure 8:
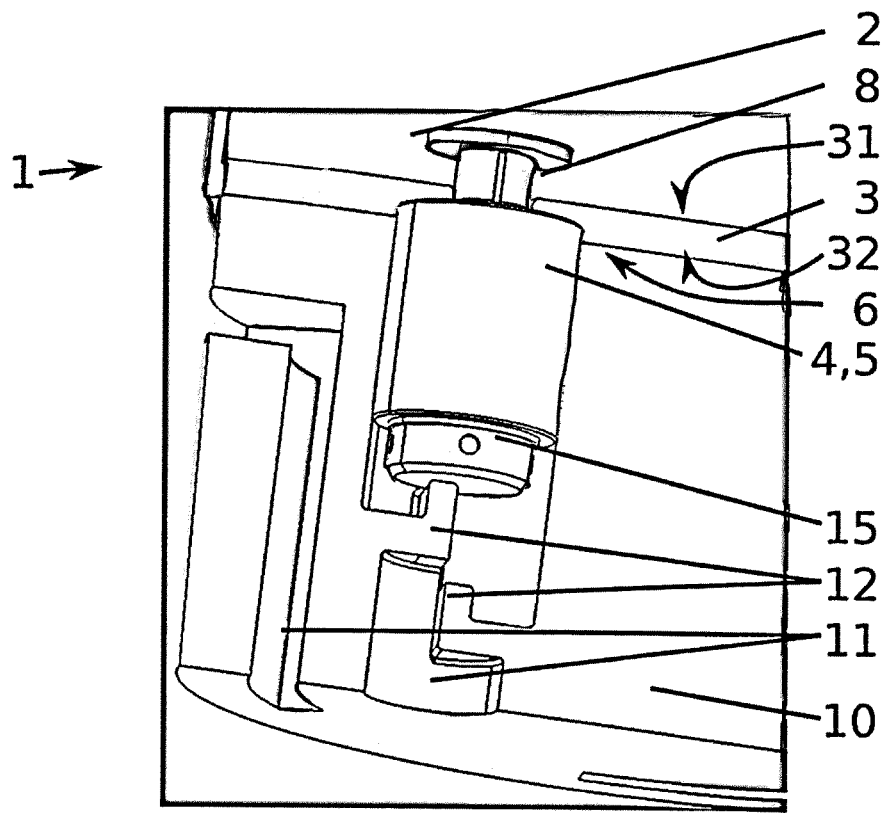
FIG. 8 is a partial half-cut perspective view of another of different embodiments of a submersible pump disclosed with different embodiments of securing members.

FIGS. 6 to 8 show an embodiment of a securing member 10 which is attached to a submersible pump 2 each. The surrounding medium, in particular a liquid 100 can reach the sensing element 15 through one or more channels 11. The channel 11 or the channels 11 extend through the securing member 10. Alternatively, a channel 11 can also extend between the securing member 10 and the bottom end 35. The securing member 10 comprises at least one obstacle 12 which is arranged in the channel 11 and which effects the fluid communication between the sensor capsule 4 and the fluid 100 in which the submersible pump 2 is submersed.

In FIG. 6, the securing member 10 comprises a mounting member 64 which facilitates mounting the sensor capsule 4 in the sensor position 6. The obstacle 12 protects the sensor capsule 4 from, e.g., particles which are suspended in the liquid 100 and can be removable. The mounting member 64 and the obstacle 12 can be placed in the channel 11 after the sensor capsule 4 is moved through the channel 11 until the sensor capsule 4 reached the sensor position 6 at the bottom end 35 of the housing 3.

In FIG. 7, the securing member 10 comprises two obstacles 12 which are located in the channel 11. The obstacles 12 are located diametrically opposite of each other in the channel 11 which allows a particularly effective protection of the sensing element 15 from particles which might be present in the liquid 100 in which the submersible pump assembly 1 is to be submersed. Each of the obstacles 12 comprises a protrusion that extends from side wall of the essentially cylindrical channel 11 to the interior of the channel 11 and a projection perpendicular to the protrusion so that particles in the liquid 100 can sediment on the obstacle 12. In this embodiment, the sensor capsule 4 can be inserted in the channel 11 before the securing member 10 is attached to the housing 3 of the submersible pump 2. The sensor capsule 4 can be dismounted when the securing member 10 is detached from the housing 3 and the obstacles 12 can be cleaned to remove sediment particles.

FIG. 8 will be described with respect to the differences to the embodiment of FIG. 7. In FIG. 8, the securing member 10 comprises more than one channel 11. The additional channel is arranged to improve the flow of liquid 100 near the sensor capsule 4 so that heat from the sensor capsule 4 can be transferred to the liquid 100. This can improve the cooling of the sensor capsule 4 during operation and is particularly advantageous when the sensor capsule 4 is adapted to make temperature measurements.

Figure 9:
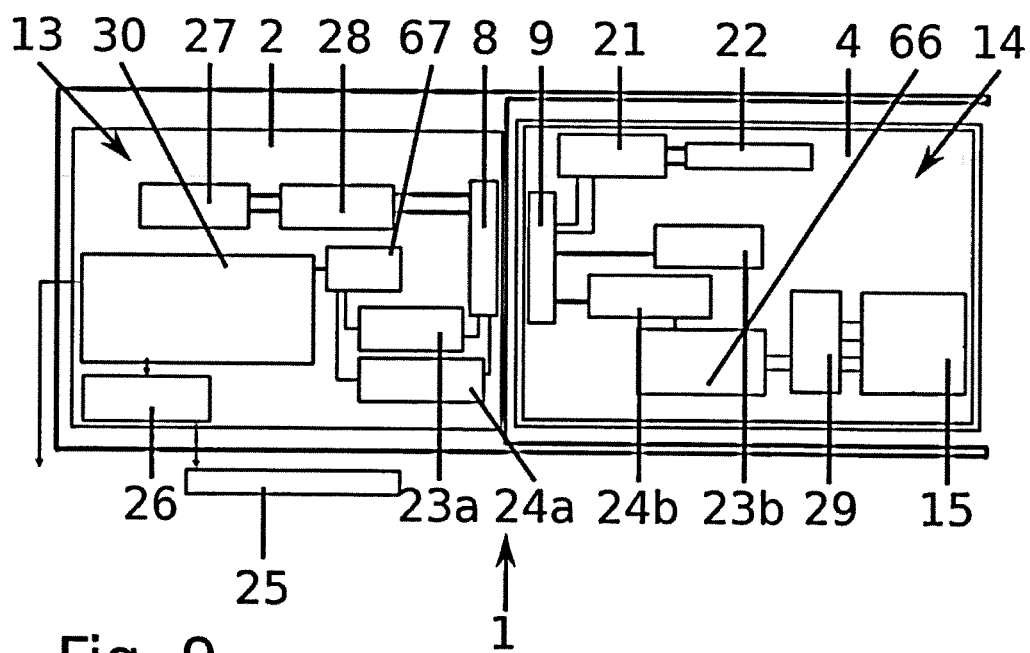
FIG. 9 is schematic view of an embodiment of the electronics of a submersible pump assembly disclosed herein.

FIG. 9 shows a schematic of electronics of a submersible pump assembly 1 as explained with reference to FIGS. 1 to 3. The power and/or data is transferred via a resonance circuits which comprise the primary coil 8 of the submersible pump 2 and the secondary coil 9 of the sensor capsule 4.

The submersible pump 2 comprises the electronic control unit 13 with a power supply 27, a power driver 28, a microcontroller 30, a coil driver for controlling the primary coil 8, and a series resonance circuit with the primary coil 8.

The power supply 27 can be a low voltage power supply, e.g., 5 V, <200 mA, which supplies the microcontroller 30 and the resonance circuit. The microcontroller 30 is adapted to handle the startup by finding the optimal driving frequency of the half-bridge and/or the primary coil 8 so that it matches the optimal frequency of the resonance circuit for power and/or data transfer. The electronic control unit 13 is configured to scan primary coil operation frequencies for operating the primary coil 8 at a frequency fulfilling a first condition that the power transmission efficiency of the inductive power transfer between the primary coil 8 and the secondary coil 9 is above a minimum power transmission efficiency and fulfilling a second condition that the signal-to-noise ratio is above a minimum signal-to-noise ratio. The primary coil operation frequency is in the range of 0.5 kHz to 200 kHz, preferably in the range of 1 kHz to 100 kHz, more preferably in the range of 5 kHz to 50 kHz for wirelessly transferring data and/or power between the submersible pump 2 and the sensor capsule 5.

The electronic control unit 13 comprises a modulation device 23a and a demodulation device 24a to perform modulation and/or demodulation of the communication to and from the sensor capsule 4, wherein the modulation device 23a and the demodulation device 24a are electrically connected to the microcontroller 30 and the primary coil 8.

The microcontroller 30 can comprise or be electrically connected to a communication device 26 which forms an interface to a control interface 25, e.g., an UART interface to other devices such as electronics which control the submersible pump 2. The half-bridge driver is adapted to handle the powering of the resonance circuit and the primary coil 8 with the frequency relayed from the microcontroller 30. The microcontroller 30 can be adapted to run routines to detect whether the submersible pump 2 runs dry, i.e., without any liquid 100 and/or to improve tolerance compensation for compensating for example effects of a misaligned sensor capsule 4 in the sensor position 6. The electronic control unit 13 comprises a data storage 67 which is connected to the microcontroller 30, the modulation device 23a, and the demodulation device 24b. The data storage 67 can store data that is to be sent from the submersible pump 2 to the sensor capsule 4 and/or to be received from the sensor capsule 4 by the submersible pump 2.

The sensor electronics 14 of the sensor capsule 4 comprises a sensor capsule power supply 21, an optional power storage 22, a modulation device 23b and a demodulation device 24b, a sensor controller 66, the sensing device 15, a signal converter 29, and optionally a data memory for storing information which can in particular be read and/or written without cables or opening the casing 5.

The sensor capsule power supply 21 supplies the sensor electronics 14 with electric power which can be transmitted to the power supply 22 from the submersible pump 2 via the primary coil 8 and the secondary coil 9, and/or from the power storage 22. The power supply 21 converts an alternating current as receivable by power and/or data transfer from the submersible pump 2 to a directed current using a rectifier. The electric energy of the directed current is stored in a capacitor and turned into a regulated voltage which supplies the sensor electronics 14.

The sensing device 15 senses an analog signal by a measurement of a property of a liquid 100 in which the pump assembly 1 is to be submersed. The analog signal is directed to the signal converter 29 which converts the analog signal into a digital signal and directs the digital signal to the sensor controller 66. The sensor controller 66 is adapted to generate commands to perform measurements by the sensing device 15 and/or to facilitate the communication between the sensor capsule 4 and the submersible pump 2.

The communication between the sensor capsule 4 and the submersible pump 2 can be realized for example by modulating the communication signals directly onto the power transfer signals by the modulation devices 23a, 23b. For example, this can be done by an amplitude shift keying (ask) method, a frequency shift keying (fsk), a phase shift keying (psk), and/or a combination thereof. For example, the communication by amplitude shift keying can be achieved by turning "on" and "off" the primary coil 8 in a pulsed pattern, i.e., by directly modulating the electromagnetic field emission from the primary coil 8, and by changing the resonance part of the resonance circuit in the sensor capsule 4 which results in a voltage change across the primary coil 8. To receive and evaluate a received signal, the demodulation devices 24a, 24b can demodulate the alternating current patterns in the primary coil 8 and/or secondary coil 9 and the microcontroller 30 and/or the sensor controller 66 can evaluate the received signal and/or control commands. Alternatively, the communication between the sensor capsule 4 and the submersible pump 2 can be provided by other known wireless techniques, e.g., Bluetooth or other standard communication techniques which are capable of passing through the casing 5 and/or the housing 3.

The sensor electronics 14 are configured to generate a pump control command, for example an on/off switching command or a pump speed command, and to wirelessly send said pump control command from the secondary coil 9 through the housing 3 and the casing 5 to the primary coil 8. Thereby, the sensor electronics 14 can be used for closed-loop controlling the pump operation. The sensor electronics 14 comprises a parallel resonance circuit with the secondary coil 8, optionally the power supply 21, the sensor controller 66, and an ASSP (application specific standard product) analog frontend. The parallel resonance circuit is matched to resonate at the same frequency as the serial resonance circuit in the electronic control unit 13 and uses the secondary coil 9 to convert the transferred magnetic field into a voltage with an alternating current. The alternating current is turned into a regulated voltage by the sensor capsule power supply 21 to supply the remaining components of the sensor electronics 14. The ASSP analog frontend samples and filters the analog output voltage from the sensing element 15 which converts a measurement of a physical quantity into a voltage which is transferable to the submersible pump 2. Even if no measurements are performed by the sensor capsule 4, the sensor capsule 4 can be used to supply the submersible pump 2 with application or configuration information, e.g., to update the software of the submersible pump 2 without the need of dismounting the submersible pump 2.

Figure 10:
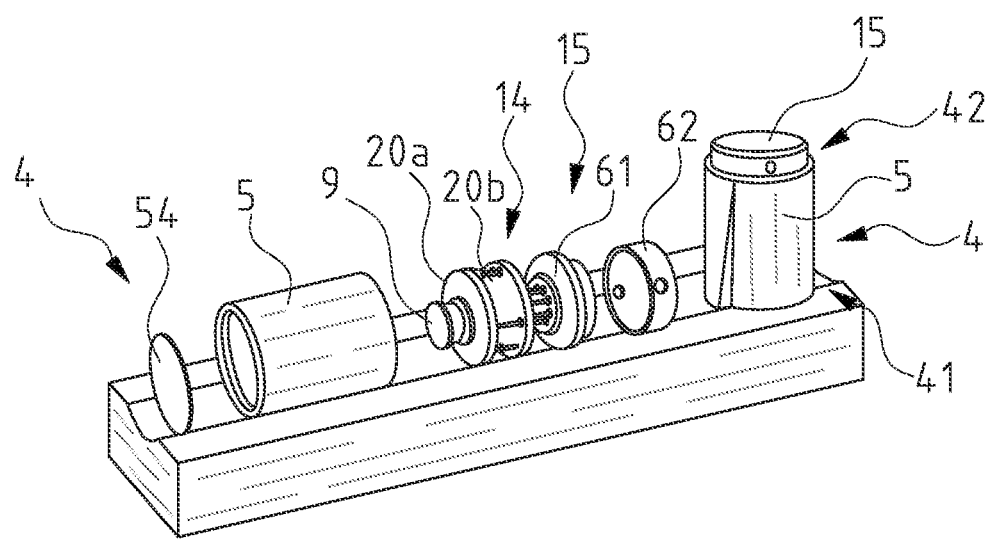
FIG. 10 is a perspective view of a disassembled and on an assembled embodiment of a sensor capsule disclosed herein.

FIG. 10 shows a perspective view on two sensor capsules 4 according to an embodiment of the present disclosure. The sensor capsule 4 in the left of FIG. 10 is disassembled and the sensor capsule 4 and the right of FIG. 10 is in a assembled state. The sensor capsules 4 are explained with reference to the drawings in FIGS. 1 to 3. In FIG. 10, it is shown that the sensing element 15 comprises sensing electronics 61 and a protective cap 62. The sensing electronics 61 are electrically connected to the sensor electronics 14 which is located on the printed circuit boards 20a, 20b. The protective cap 62 is made of metal, e.g., stainless steel, or plastic and pressed onto the casing 5. The protective cap has holes allowing a liquid 100, in which the sensor capsule 4 is to be submersed, to flow around the sensing electronics 61 for accurate measurements of liquid properties, e.g. temperature and/or pressure.

Figure 11:
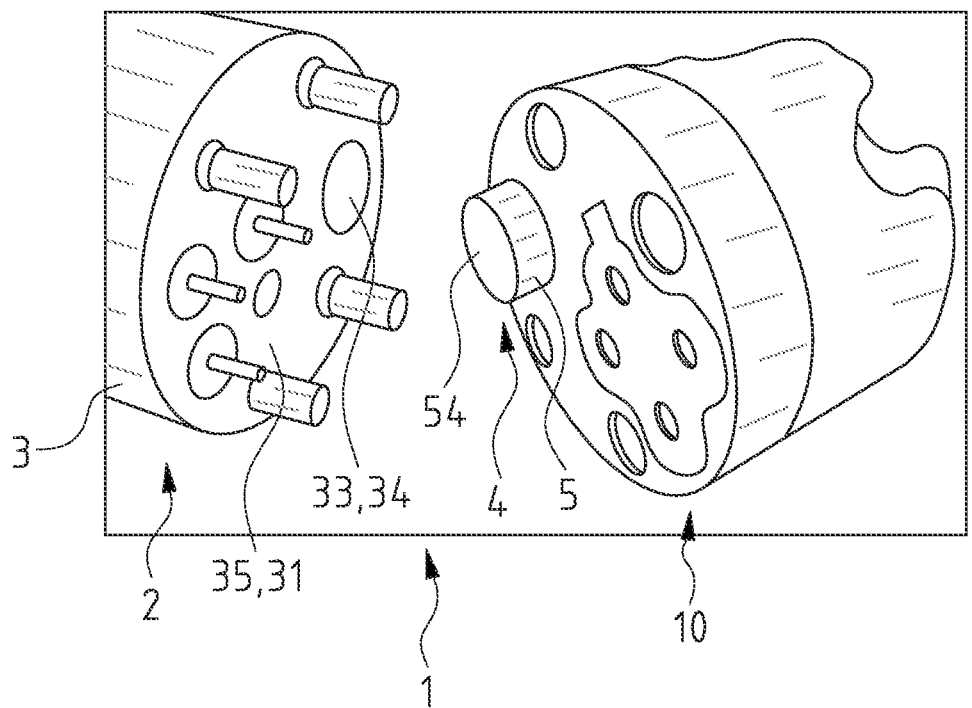
FIG. 11 is a perspective detail view of a submersible pump assembly, disclosed herein, showing the decoupled sensor capsule.

FIG. 11 shows a perspective view on a submersible pump assembly 1 according to an embodiment of the present disclosure. The submersible pump assembly 1 is explained with reference to the drawings in FIGS. 1 to 2. The bottom end 35 of the submersible pump 2 is welded onto a side wall of the housing 3. The bottom end 35 comprises at the outer face 31 of the housing 3 the housing recess 33 at the housing transmission section 34. The sensor capsule 4 comprises the casing 5, wherein the casing transmission section 54 is made of a material different from the material of the casing 5. The sensor capsule 4 is introduced into the securing member 10, and the securing member 10 is adapted to be attached to the submersible pump 2. When the securing member 10 is attached to the submersible pump 2 the sensor capsule 4 is at the sensor position 6 (not shown).

FIG. 12 shows an alternative integration of the sensor capsule 4. The sensor capsule 4 can be integrated in and/or connected to a submersible pump 2 and deliver measured information permanently or on demand by the submersible pump 2. The sensor capsule 4 can also be used as a separate unit and placed to a hollow body 60 of a submersible pump assembly 1, for example in a valve, a pipe, a pipe fitting or elsewhere related to the submersible pump 2. Therein, the sensor capsule 4 is oriented with its second sensor capsule portion 42 towards the hollow body 60 to perform measurements of the liquid 100 within the hollow body 60. The first sensor capsule portion 41 is oriented towards the submersible pump 2, and the electronic control unit 13 of the submersible pump 2 can control a controllable pump device 7, for example, to start, stop and/or control pumping of a liquid 100.

Where, in the foregoing description, integers or elements are mentioned which have known, obvious or foreseeable equivalents, then such equivalents are herein incorporated as if individually set forth. Reference should be made to the claims for determining the true scope of the present disclosure, which should be construed so as to encompass any such equivalents. It will also be appreciated by the reader that integers or features of the disclosure that are described as optional, preferable, advantageous, convenient or the like are optional and do not limit the scope of the independent claims.

The above embodiments are to be understood as illustrative examples of the disclosure. It is to be understood that any feature described in relation to any one embodiment may be used alone, or in combination with other features described, and may also be used in combination with one or more features of any other of the embodiments, or any combination of any other of the embodiments. While at least one exemplary embodiment has been shown and described, it should be understood that other modifications, substitutions and alternatives are apparent to one of ordinary skill in the art and may be changed without departing from the scope of the subject matter described herein, and this application is intended to cover any adaptations or variations of the specific embodiments discussed herein.

In addition, "comprising" does not exclude other elements or steps, and "a" or "one" does not exclude a plural number. Furthermore, characteristics or steps which have been described with reference to one of the above exemplary embodiments may also be used in combination with other characteristics or steps of other exemplary embodiments described above. Method steps may be applied in any order or in parallel or may constitute a part or a more detailed version of another method step. It should be understood that there should be embodied within the scope of the patent warranted hereon all such modifications as reasonably and properly come within the scope of the contribution to the art. Such modifications, substitutions and alternatives can be made without departing from the spirit and scope of the disclosure, which should be determined from the appended claims and their legal equivalents.

While specific embodiments of the invention have been shown and described in detail to illustrate the application of the principles of the invention, it will be understood that the invention may be embodied otherwise without departing from such principles.

LIST OF REFERENCE CHARACTERS 1 submersible pump assembly
2 submersible pump
3 housing
4 sensor capsule
5 casing
6 sensor position
7 controllable pump device
8 primary coil
9 secondary coil
10 securing member
11 channel
12 obstacle
13 electronic control unit
14 sensor electronics
15 sensing element
20a, 20b printed circuit board
21 sensor capsule power supply
22 power storage
23a, 23b modulation device
24a, 24b demodulation device
25 control interface
26 communication device
27 power supply
28 power driver
29 signal converter
30 microcontroller
31 outer face
32 inner face
33 housing recess
34 housing transmission section
35 bottom end
36 outer housing recess
37 sealing element
41 first sensor capsule portion
42 second sensor capsule portion
52 inner face
53 casing recess
54 casing transmission section
57 sealing element
60 hollow body
61 sensing electronics
62 cap
63 O-ring
64 mounting member
66 sensor controller
67 data storage
100 liquid
d distance
I primary magnetic axis
II secondary magnetic axis
A, L longitudinal axis

What is claimed is:

1. A submersible pump assembly comprising:
   a submersible pump comprising:
      a pump housing; and
      a primary coil within the housing; and
   a sensor capsule comprising:
      a hermetically sealed casing;
      a securing member comprising a channel and embracing the sensor capsule, wherein the sensor capsule is releasably mountable at a sensor position by a releasable mounting of the securing member to the housing and by a releasable mounting of the sensor capsule within the channel of the securing member, the sensor position being located at an outer face of the pump housing; and
      a secondary coil within the casing, wherein the primary coil and the secondary coil are arranged to be inductively coupled with each other for wirelessly transferring data and/or power through the housing and the casing with the sensor capsule mounted at the sensor position.

2. The submersible pump assembly according to claim 1, wherein:
   an inner face of the housing comprises a housing recess; and
   the primary coil is arranged in the housing recess.

3. The submersible pump assembly according to claim 1, wherein an inner face of the casing comprises a casing recess, wherein the secondary coil is arranged in the casing recess.

4. The submersible pump assembly according to claim 1, wherein the distance between the primary coil and the secondary coil is less than 5 mm, with the sensor capsule mounted at the sensor position.

5. The submersible pump assembly according to claim 1, wherein the primary coil has a primary magnetic axis and the secondary coil has a secondary magnetic axis, wherein the secondary magnetic axis is coaxially and/or in parallel aligned with the primary magnetic axis, with the sensor capsule mounted at the sensor position.

6. The submersible pump assembly according to claim 1, wherein:
the sensor capsule defines a longitudinal axis extending from a first sensor capsule portion that is releasably mountable at the sensor position to a second sensor capsule portion;
the sensor capsule is circumferentially embraced by the securing member; and
the channel is configured for fluid communication between the second sensor capsule portion and an ambient fluid in which the submersible pump is configured to be submersed.

7. The submersible pump assembly according to claim 6, wherein the securing member comprises a filter, a damping element and/or an obstacle arranged in the channel configured for fluid communication between the second sensor capsule portion and the ambient fluid in which the submersible pump is configured to be submersed.

8. The submersible pump assembly according to claim 1, wherein the securing member is made of a plastic or composite material.

9. The submersible pump assembly according to claim 1, wherein the housing and/or the casing comprises a transmission section at the sensor position, the transmission section comprising stainless steel, glass, and/or a metal with an electrical conductivity less than $10^7$ A/(Vm).

10. The submersible pump assembly according to claim 1, wherein the housing and/or the casing comprises a transmission section at the sensor position, the transmission section comprising stainless steel, glass, and/or a metal with a relative magnetic permeability below 5.

11. The submersible pump assembly according to claim 1, further comprising an electronic control unit configured to scan primary coil operation frequencies for operating the primary coil at a frequency fulfilling a first condition that a power transmission efficiency is above a minimum power transmission efficiency and fulfilling a second condition that a signal-to-noise ratio is above a minimum signal-to-noise ratio.

12. The submersible pump assembly according to claim 1, wherein:
the casing of the sensor capsule has an essentially cylindrical shape defining a longitudinal axis; and
the secondary coil defines a magnetic axis in parallel to the longitudinal axis of the casing.

13. The submersible pump assembly according to claim 1, wherein:
the sensor capsule defines a longitudinal axis extending from a first sensor capsule portion, that is releasably mountable at the sensor position, to a second sensor capsule portion; and
the first sensor capsule portion comprises sensor electronics and the second sensor capsule portion comprises a sensing element.

14. The submersible pump assembly according to claim 1, wherein:
the submersible pump has an essentially cylindrical shape defining a longitudinal axis for being oriented essentially along a vertical direction during pump operation and having a bottom end; and
the sensor position is located at an outer face of the bottom end of the housing of the submersible pump.

15. The submersible pump assembly according to claim 1, wherein:
the sensor capsule comprises sensor electronics within the hermetically sealed casing;
the sensor electronics are configured to generate a pump control command and to wirelessly send said pump control command from the secondary coil through the housing and the casing to the primary coil.

16. A method for operating a submersible pump assembly, the method comprising the steps of:
providing the submersible pump assembly with the submersible pump assembly comprising a submersible pump comprising a pump housing and a primary coil within the housing and a sensor capsule comprising a hermetically sealed casing, wherein the sensor capsule is releasably mountable at a sensor position located at an outer face of the pump housing and a secondary coil within the casing, wherein the primary coil and the secondary coil are arranged to be inductively coupled with each other for wirelessly transferring data and/or power through the housing and the casing with the sensor capsule mounted at the sensor position;
releasably mounting the sensor capsule at the sensor position via releasably mounting a securing member to the housing and releasably mounting the sensor capsule within a channel of the securing member such that the primary coil within the housing of the submersible pump and the secondary coil within the hermetically sealed casing of the sensor capsule are arranged to be inductively coupled with each other; and
wirelessly transferring data and/or power by an inductive coupling between the primary coil and the secondary coil through the housing and the casing.

17. The method according to claim 16, wherein the step of wirelessly transferring data and/or power comprises generating a primary coil operation frequency in the range of 0.5 kHz to 200 kHz.

18. The method according to claim 16, further comprising the steps of scanning operation frequencies and finding an operation frequency fulfilling a first condition that a power transmission efficiency is above a minimum power transmission efficiency and fulfilling a second condition that a signal-to-noise ratio is above a minimum signal-to-noise ratio.

19. The method according to claim 16, further comprising the step of generating a pump control command by sensor electronics within the hermetically sealed casing of the sensor capsule, wherein the step of wirelessly transferring data and/or power comprises sending said pump control command from the secondary coil to the primary coil pump.

20. The method according to claim 16, wherein the step of releasably mounting triggers uploading data, such as a pump configuration or software update, from the secondary coil to the primary coil.

21. A submersible pump assembly comprising:
a submersible pump comprising:
- a pump housing comprising a pump housing longitudinal axis;
- a primary coil within the housing; and a sensor capsule comprising:
- a hermetically sealed casing, the pump housing being located radially beyond the hermetically sealed casing with respect to the pump housing longitudinal axis;
- a securing member comprising a channel, wherein the sensor capsule is releasably mountable at a sensor position via a releasable connection of the securing member to the housing and via a releasable connection of the sensor capsule within the channel of the securing member, the sensor position being located at an outer face of the pump housing; and
- a secondary coil within the casing, wherein the primary coil and the secondary coil are arranged to be inductively coupled with each other for wirelessly transferring data and/or power through the housing and the casing with the sensor capsule mounted at the sensor position.

* * * * *